(12) United States Patent
Senarath et al.

(10) Patent No.: US 7,383,057 B1
(45) Date of Patent: Jun. 3, 2008

(54) CYCLIC TRANSMIT POWER ADJUSTMENT SCHEME

(75) Inventors: Gamini Senarath, Nepean (CA); Yoon Chae Cheong, Kanata (CA); Shalini Periyalwar, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 627 days.

(21) Appl. No.: 10/848,438

(22) Filed: May 18, 2004

Related U.S. Application Data

(60) Provisional application No. 60/472,380, filed on May 21, 2003.

(51) Int. Cl.
*H04B 7/00* (2006.01)
*H04Q 7/20* (2006.01)

(52) U.S. Cl. ............... 455/522; 455/453; 455/63.1; 455/561; 455/127.1; 455/127.5; 455/343.5

(58) Field of Classification Search ............... 455/450, 455/453, 67.11, 512, 434, 455, 464, 561, 455/63.1, 226.1, 226.3, 296, 522, 127.1, 455/127.5, 343.5; 375/262, 227, 229, 224, 375/232, 350, 222, 225
See application file for complete search history.

(56) References Cited

U.S. PATENT DOCUMENTS

| | | | |
|---|---|---|---|
| 6,262,980 B1 * | 7/2001 | Leung et al. ............... 370/336 |
| 6,804,521 B2 * | 10/2004 | Tong et al. .................. 455/450 |
| 6,965,582 B1 * | 11/2005 | Moulsley .................... 370/329 |
| 7,016,319 B2 * | 3/2006 | Baum et al. ................. 370/329 |
| 7,046,678 B2 * | 5/2006 | Jiang et al. ............ 370/395.41 |
| 7,099,384 B1 * | 8/2006 | Jalali et al. .................. 375/229 |
| 2002/0085621 A1 * | 7/2002 | Kockmann et al. ......... 375/132 |
| 2002/0147828 A1 * | 10/2002 | Chen et al. .................. 709/231 |
| 2003/0045288 A1 * | 3/2003 | Luschi et al. ............... 455/434 |
| 2004/0203968 A1 * | 10/2004 | Gopalakrishnan et al. .. 455/512 |
| 2005/0018644 A1 * | 1/2005 | Gessner et al. ............. 370/349 |
| 2005/0041669 A1 * | 2/2005 | Cansever et al. ...... 370/395.21 |

* cited by examiner

*Primary Examiner*—Sujatha Sharma
(74) *Attorney, Agent, or Firm*—Withrow & Terranova, PLLC

(57) ABSTRACT

The present invention provides cyclic power changing patterns for transmissions in different sectors of a cellular system. The cyclic power changing patterns define unique patterns in which transmission power levels change over a period of time slots or within a group of sub-carriers. Each sector has a unique pattern, so that interference information monitored by the user elements, which are supported by base stations, are indicative of the interference contributions from adjacent sectors. Based on these interference contributions and the cyclic power changing patterns associated with these sectors, the base stations can schedule transmissions to the user elements during time slots or in sub-carriers to minimize the impact of interference from the adjacent sectors and to efficiently support dynamic needs of the individual user data packets according to QoS requirements.

37 Claims, 10 Drawing Sheets

16 TIME SLOTS,
4 PATTERNS,
9 SECTOR/CELL

16 TIME SLOTS,
4 PATTERNS,
9 SECTOR/CELL

CYCLIC TRANSMIT POWER ADJUSTMENT SCHEME

The present invention claims the benefit of U.S. provisional application Ser. No. 60/472,380 filed May 21, 2003 entitled CYCLIC TRANSMIT POWER ADJUSTMENT SCHEME, the disclosure of which is incorporated herein by reference in its entirety.

FIELD OF THE INVENTION

The present invention relates to radio frequency communications, and in particular to providing cyclic power control patterns for multiple sectors.

BACKGROUND OF THE INVENTION

As illustrated in FIG. 1, a cellular communication network 10 is supported by numerous base stations 12, which are capable of facilitating wireless communications throughout corresponding cells 14. Generally, each cell 14 is divided into numerous sectors 16, wherein the base stations 12 will have dedicated transmit and receive capabilities for each sector 16. A base station 12 may provide any number of sectors 16 to form a cell 14. For example, there are three sectors 16 forming each cell in FIG. 1, and nine sectors 16 forming the cell 14 in FIG. 2. User elements 18, such as mobile telephones, wireless personal digital assistants, wireless modems, and the like, will facilitate bi-directional wireless communications with the transmitter and receiver electronics associated with a certain sector 16, in which the user element 18 is located. Given the need for cells 14 and sectors 16 therein to be adjacent to one another, a user element 18 serviced by a first sector 16 in a first cell 14 will likely be subjected to transmissions to other user elements 18 from other sectors 16 in the first cell 14, as well as from other cells 14.

The ability of a user element 18 to overcome interference from other sectors 16 and cells 14 is generally a function of the transmit power of those sectors. The higher the power of the signal directed to the user element 18, the easier the user element 18 is able to overcome such interference from other sectors 16 and cells 14. Accordingly, as a user element 18 approaches sector or cell boundaries, the power level associated with the transmitted signal decreases, and the amount of interference from other sectors 16 and cells 14 increases.

Various techniques have been proposed to minimize the impact of such intercell and intracell interference. Unfortunately, these techniques generally provide insufficient coverage at the edge of cells and impose significant penalties on system capacity and throughput, or are very costly and complex to implement. Accordingly, there is a need for a relatively efficient and cost-effective technique for minimizing the impact of intracell and intercell interference.

SUMMARY OF THE INVENTION

The present invention provides cyclic power changing patterns for transmissions in different sectors of a cellular system. The cyclic power changing patterns essentially define unique patterns in which transmission power levels change over a period of time slots or within a group of sub-carriers. Each sector has a unique pattern, so that interference information monitored by the user elements, which are supported by base stations, is indicative of the interference contributions from adjacent sectors. Based on these interference contributions and the cyclic power changing patterns associated with these sectors, the base stations can schedule transmissions to the user elements during time slots or in sub-carriers to minimize the impact of interference from the adjacent sectors and to efficiently support dynamic needs of the individual user data packets according to quality of service requirements. Scheduling does not necessarily have to minimize the impact of interference for a given user element, but the base stations can schedule data to all of the user elements being serviced to increase overall system performance, such as system capacity, per user throughput rates, and quality of service levels. A particular user experiences different levels of signal quality at different time intervals or sub-carriers because of the artificial channel condition changes created by the transmit power changes of the sectors. This allows scheduling to dynamically select the most efficient time slot for a user according to quality of service requirements and temporal data transmission needs, which increase overall throughput as well as per user throughput.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
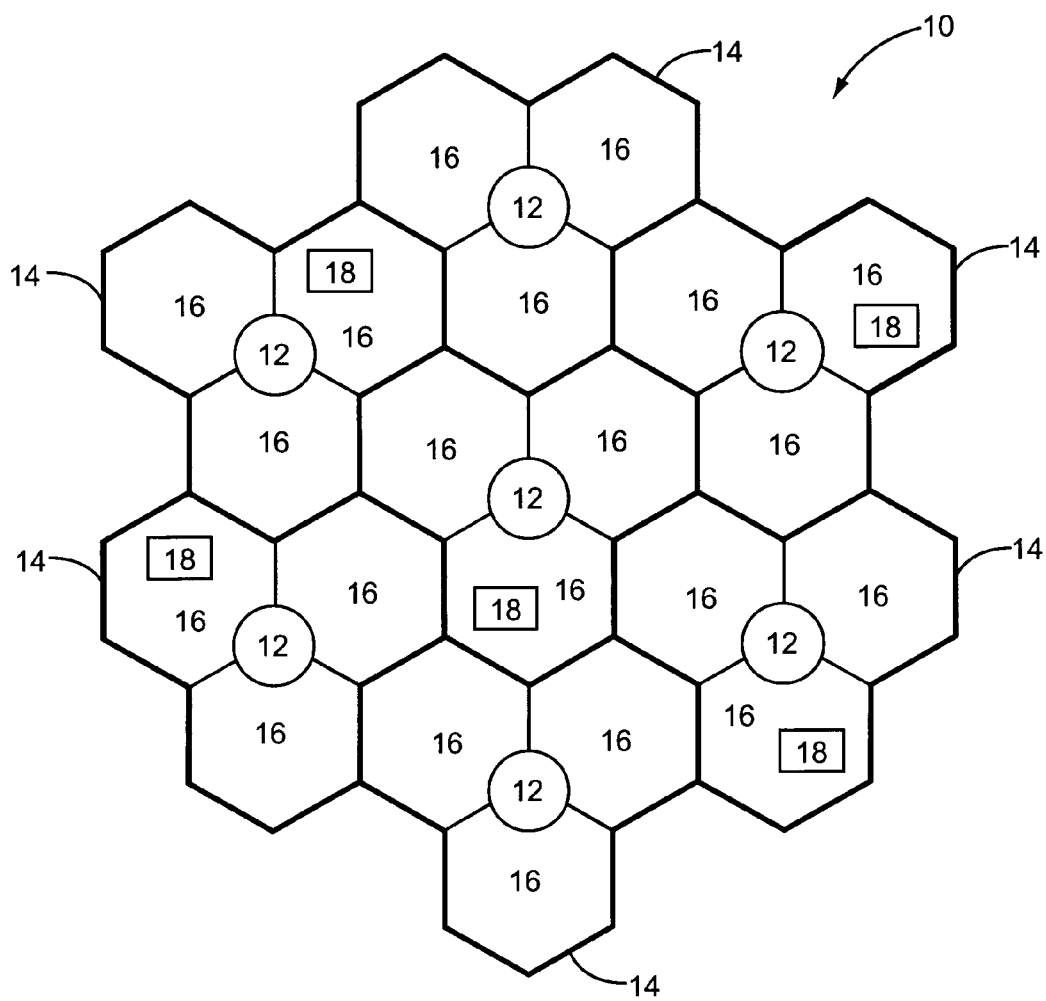
FIG. 1 illustrates a cellular layout for a typical cellular communication environment.
Figure 2:
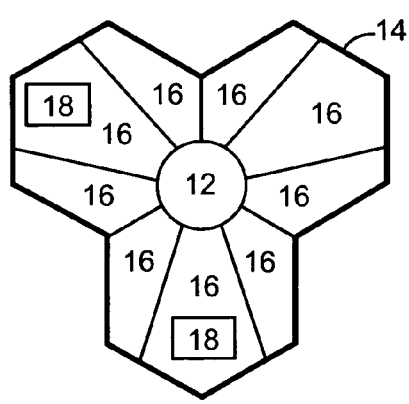
FIG. 2 illustrates a cell having nine sectors.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides for distinct power change patterns for sectors 16 that are adjacent to one another in the same and separate cells 14. The cyclic power change patterns may be associated with transmission time slots, sub-carriers in an orthogonal frequency division multiplex (OFDM) spectrum, or a combination thereof. The cyclic power change patterns define pre-defined power levels at which communications will be provided during defined time slots or for select sub-carriers, regardless of the user element 18 to which transmissions are scheduled. Accordingly, the base station 12 will control scheduling of the transmissions to the various user elements 18 in light of these cyclic power change patterns in an effort to maximize system capacity as well as individual user performance. The base station 12 will take advantage of different power levels used by the various sectors 16 at any given time slot or within any group of sub-carriers to schedule transmissions to the user elements 18 in favorable interference conditions. Generally, the user elements 18 will provide information back to the base station 12 indicative of channel conditions for particular time slots or sub-carriers. For example, it may be pre-arranged to send only a few selected time slot measurements from the user element 18.

These channel conditions will inherently provide information regarding the interference contribution from other sectors 16, and control elements associated with the base station 12. Based upon such inputs, the control elements will attempt to schedule transmissions to user elements 18 susceptible to interference from certain sectors 16 when these interfering sectors 16 are transmitting at lower power levels. For user elements 18 that are less susceptible to interference from adjacent sectors 16, transmissions may be provided at lower power levels.

Figure 3:
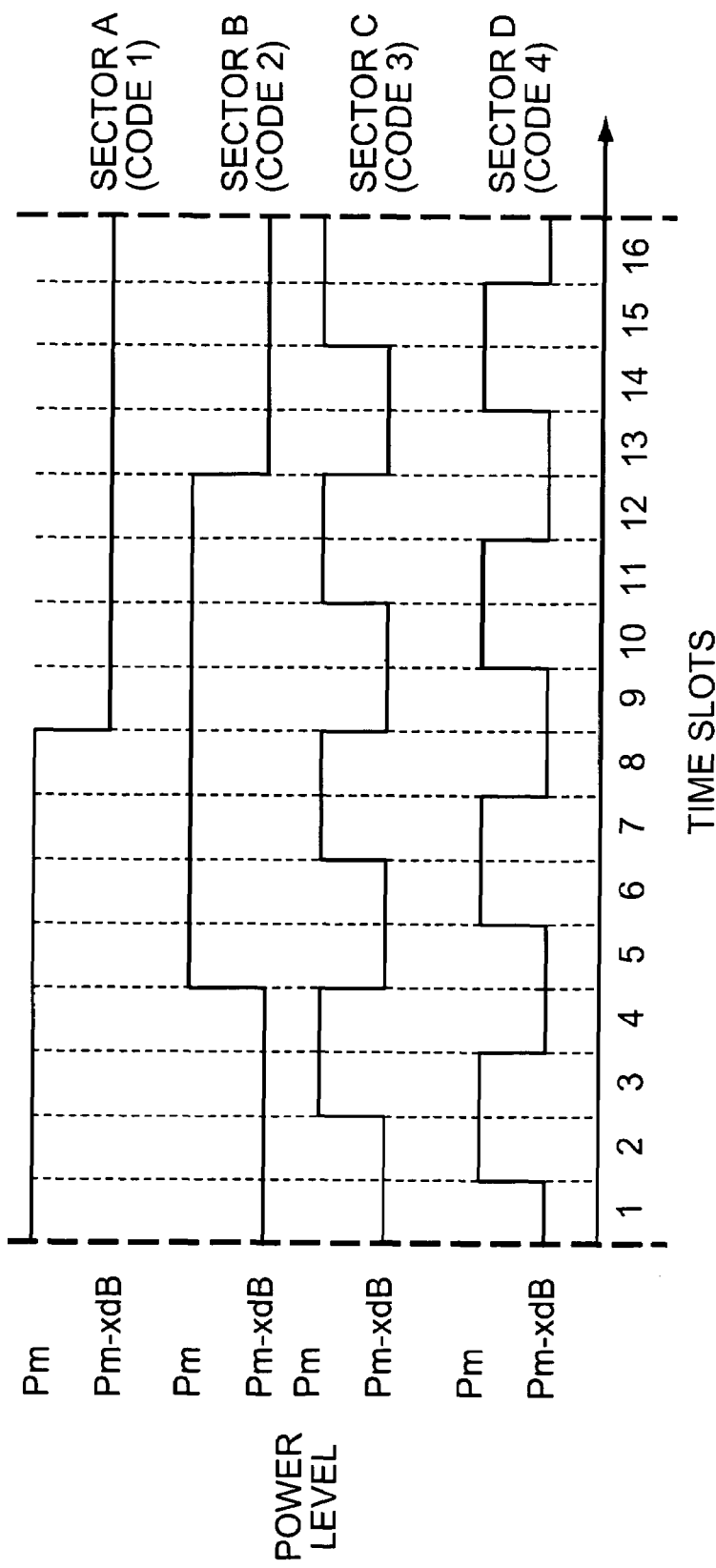
FIG. 3 illustrates a set of four unique cyclic power change patterns according to one embodiment of the present invention.

Turning now to FIG. 3, a set of four cyclic power change patterns of a given base station, referred to as Codes 1-4, are illustrated as being associated with Sectors A-D, respectively. Notably, the cyclic power change patterns may be shared over any number of sectors 16, wherein there do not need to be four sectors 16 in a cell 14, and certain cells 14 will have the same cyclic power change pattern used simultaneously in different sectors 16. Importantly, adjacent sectors 16 within the same or adjacent cells 14 should not share the same cyclic power change pattern. As illustrated in FIG. 3, the codes defining the cyclic power change patterns are orthogonal to one another and define the power levels at which any transmissions to the user elements 18 will be provided. In other words, the base station 12 will transmit at either a maximum power level ($P_M$) or a reduced power level ($P_{M-xdB}$). Notably, there can be more than two power levels; however, the number of time slots will be increased exponentially with the number of available power levels.

The optimum value of x can be selected based on simulations or actual test data for a given locale, regardless of scheduling. Thus, for Sector A, all transmissions in time slots 1-8 are transmitted at the maximum power level $P_M$, while all transmissions transmitted during time slots 9-16 are transmitted at the lower power level $P_{M-xdb}$. For Sector B, all transmissions in time slots 1-4 and 13-16 are transmitted at the lower power level $P_{M-xdb}$, wherein all transmissions during time slots 5-12 are transmitted at the maximum power level $P_M$. These cyclic power change patterns will continuously repeat every sixteen time slots in this example. In addition, although this illustrative embodiment provides a total of 16 time slots, a system may use a lesser number of time slots, depending on the traffic conditions and complexity. For example, if the 8th time slot and 13th time slot provide similar interference, one may be eliminated.

Figure 4:
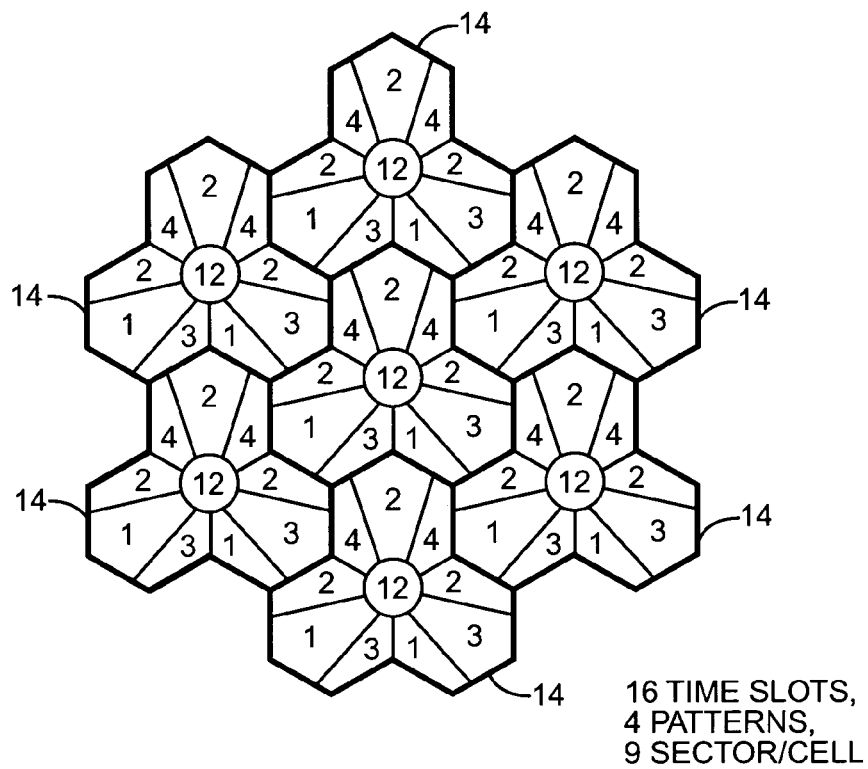
FIG. 4 illustrates a cellular environment wherein four cyclic power change patterns are provided over sixteen time slots according to one embodiment of the present invention.
Figure 5:
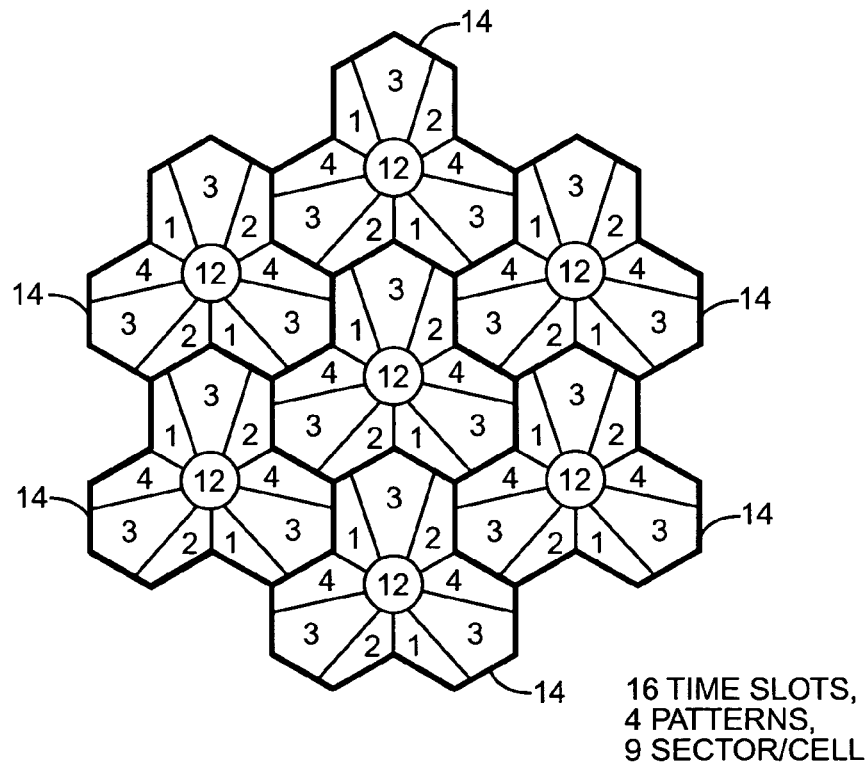
FIG. 5 illustrates a cellular environment wherein four cyclic power change patterns are provided over sixteen time slots according to a second embodiment of the present invention.

Referring now to FIG. 4, each of the cells 14 is formed from nine sectors 16, and the codes (1-4) for the respective cyclic power change patterns to be associated with a given sector are referenced in the figure instead of the generic reference number for a sector 16. As illustrated, the cyclic power change pattern for one sector 16 is not shared with any adjacent sector 16, whether it is within the same cell 14 or in an adjacent cell 14. An alternate allocation of cyclic power change patterns for a similar environment is illustrated in FIG. 5. Notably, each cell may have any number of sectors, including one sector, and the number of sectors associated with the cells of a given network 10 need not be the same. Those provided are only for the purposes of illustration.

Given the nature of the cyclic power change patterns, the various time slots throughout the period of the power change patterns provide various power level combinations among the adjacent sectors 16. As such, the base stations 12 can determine how best to schedule transmissions to the user elements 18 based on the known power levels of adjacent sectors 16. Further description regarding interference analysis and scheduling based on the cyclic power change patterns is provided below after an overview of additional power cycling techniques.

Figure 6:
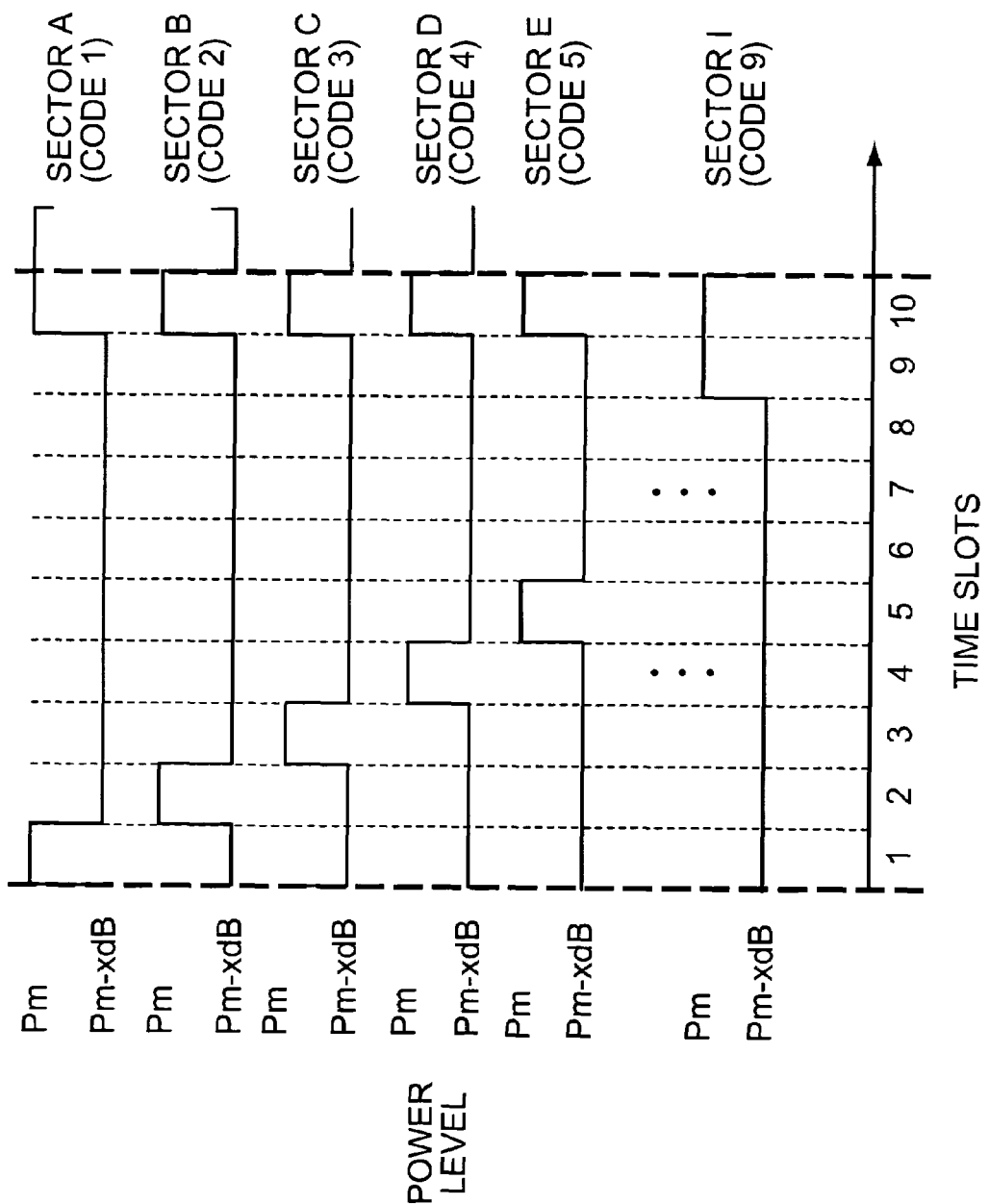
FIG. 6 illustrates cyclic power change patterns for nine sectors according to a second embodiment of the present invention.

Similarly to the cyclic power changing patterns of FIG. 3, the cyclic power changing patterns of FIG. 6 control the power levels between a maximum power $P_M$ and a lower power $P_{M-xdb}$ on a time slot by time slot basis. In this example, there are nine unique patterns, Codes 1-9, for Sectors A-I, respectively. Each code transmits at maximum power $P_M$ during the tenth time slot and during one other time slot, in which none of the other nine sectors are subjected to maximum power. In Sector A, the base station 12 will transmit at maximum power during time slots 1 and 10; for Sector B, during time slots 2 and 10; for Sector C, during time slots 3 and 10; and so on. Thus, during a given time slot, there are numerous power level combinations among the various sectors 16, and in particular, for the base station 12, one sector will transmit at full power for one time slot, wherein none of the other sectors 16 for the base station 12 will be subjected to maximum transmit power. Notably, in time slot 10, all the base stations 12 will transmit at full power in each of the nine sectors 16. Time slot 10, in this particular example, may be used to obtain the reference power levels of each sector 16 for the purpose of selecting of the best sector 16 for transmission because all the sectors 16 transmit at the same power. Alternatively, a different time slot could be used for this purpose.

Figure 7:
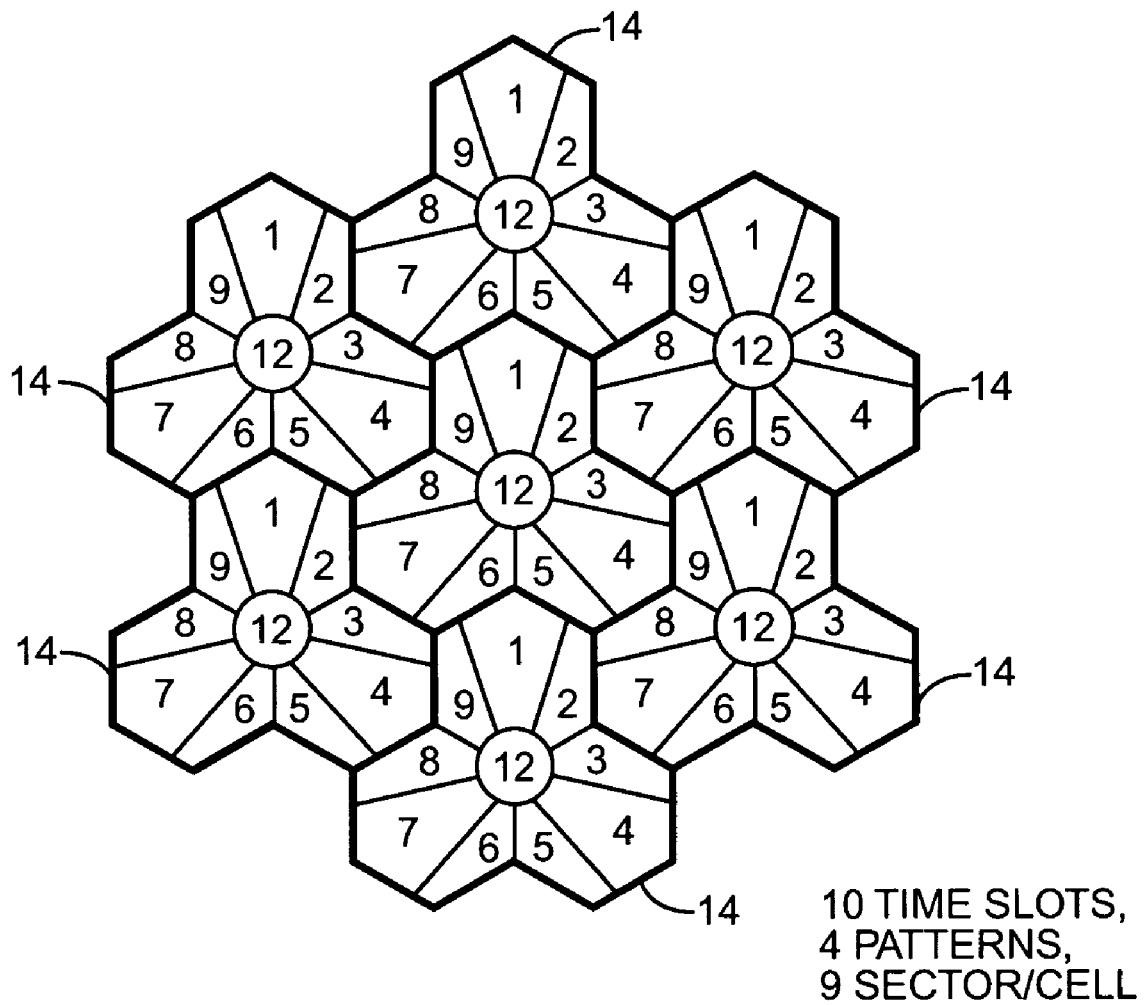
FIG. 7 illustrates a cellular environment wherein nine cyclic power change patterns are provided over ten time slots according to a third embodiment of the present invention.
Figure 8A:
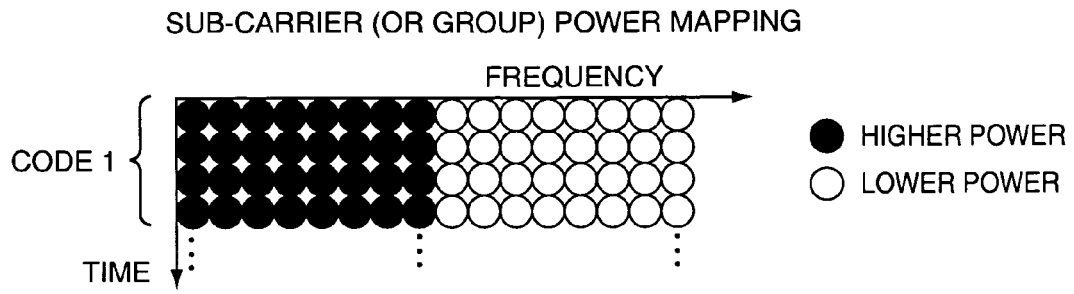
FIGS. 8A-8D illustrate a cyclic power change pattern in an orthogonal frequency division multiplexed environment according to one embodiment of the present invention.
Figure 8B:
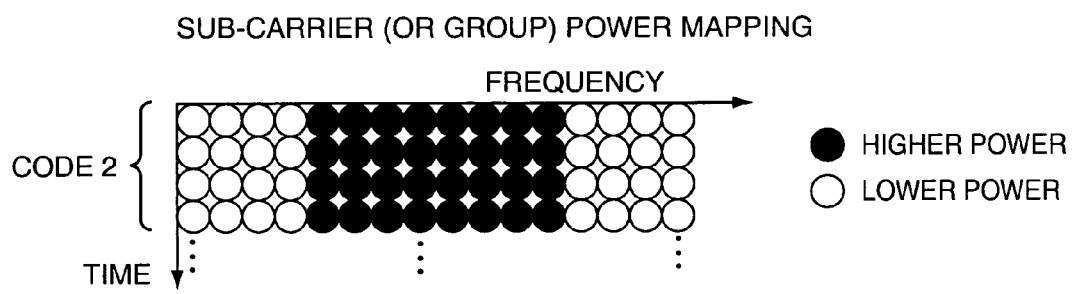
Figure 8C:
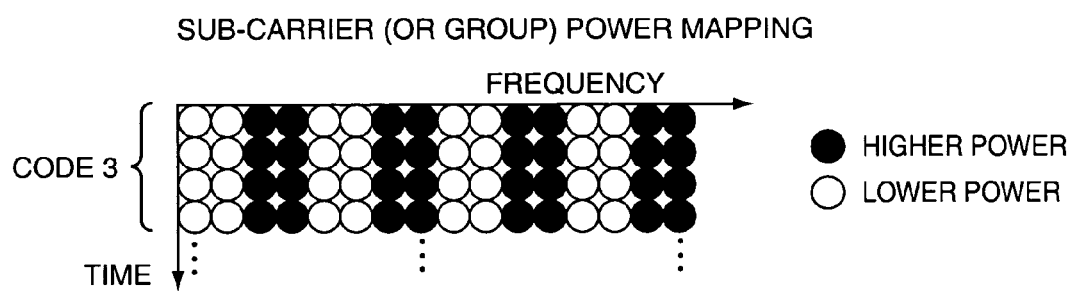
Figure 8D:
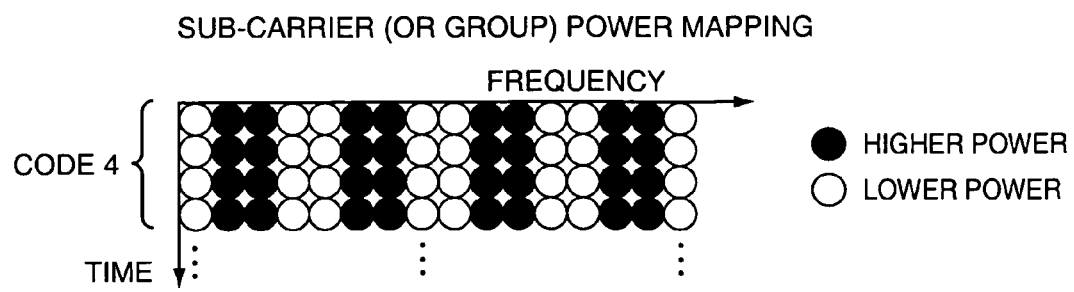

With reference to FIG. 7, an exemplary allocation of a cyclic power change pattern having nine unique patterns or codes is illustrated. Again, the codes in adjacent sectors 16 are unique, regardless of the sectors 16 being within the same or different cells 14.

In addition to providing power changing patterns based on transmission time slots, similar patterns may be provided among groups of sub-carriers in an Orthogonal Frequency Division Multiplexing (OFDM) embodiment, as illustrated in FIGS. 8A-8D. Since OFDM is a multi-carrier transmission technique, the available spectrum is divided into many sub-carriers, each being modulated by data using different code and modulation levels resulting in different rates. OFDM supports multiple access by allocating different sub-carriers or groups thereof to different users. The sub-carriers for OFDM are orthogonal and closely spaced to provide an efficient spectrum. Each narrow band sub-carrier is modulated using various modulation formats, such as quadrature phase-shift keying (QPSK) and quadrature amplitude modulation (QAM). OFDM modulation is provided using an Inverse Fast Fourier Transform (IFFT). Initially, data for transmission is mapped into quadrature-based symbols that are encoded onto the individual sub-carriers. An IFFT is performed on the set of modulated sub-carriers to produce an OFDM symbol in the time domain. Typically, a cyclic prefix is created and appended to the beginning of the OFDM symbol before it is amplified and transmitted. During reception, the OFDM symbols are processed using a fast Fourier transform (FFT) to recover the modulated sub-carriers, from which the transmitted symbols can be recovered and decoded to arrive at the transmitted data.

As noted, to facilitate multiple user access, data for transmission is allocated to groups of adjacent sub-carriers, wherein these groups remain consistent from one OFDM symbol to the next. With continued reference to FIGS. 8A-8D, each circle represents individual sub-carriers or a group of sub-carriers for a sequence of OFDM symbols. For conciseness and readability, the term "sub-carrier" is used. Each row represents the sub-carriers associated with an OFDM symbol, and each OFDM symbol is transmitted in sequence over time.

At any given time, symbols to be transmitted to any user element 18 can be transmitted on any sub-carrier, and as such, any given sub-carrier can be used for transmission to any user element 18 at any given time. As depicted, darkened circles represent sub-carriers transmitting at a higher power level, such as maximum power $P_M$, and light circles represent sub-carriers transmitting at a lower power, such as $P_{M-xdb}$. Different sub-carriers transmit at the scheduled power levels, regardless of which user element's information is being transmitted. Again, the base station 12 will provide scheduling to maximize overall system capacity while effectively providing individual user requirements such as quality of service and individual throughput to any given user element 18. In this example, there are four codes used in a cyclic fashion. Each code has a unique power pattern over the available sub-carriers at any given time. The code allocation can be allocated in a fashion similar to that depicted in FIGS. 4 and 5 for a four-code system. Notably, the number of sub-carriers used at any given time will depend on the particular design.

Figure 9:
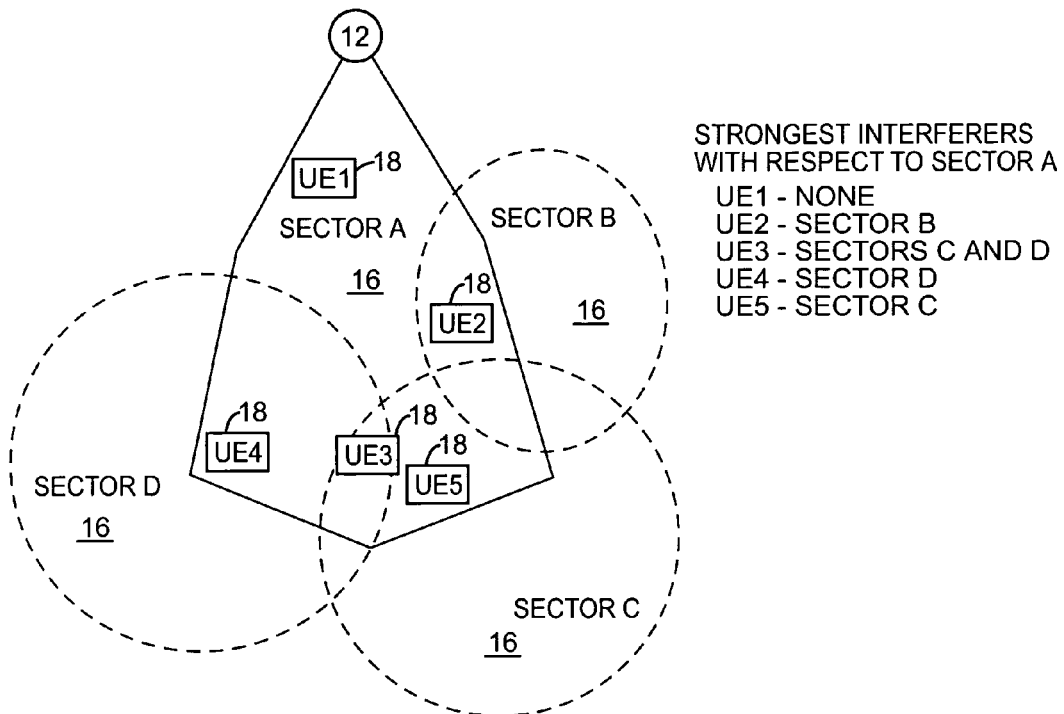
FIG. 9 illustrates a communication situation wherein multiple user elements being served by a first sector are interfered with by transmissions from other sectors.

Turning now to FIG. 9, an exemplary scenario is provided wherein five user elements 18 (UE1-UE5) geographically spaced from one another are being served via the transmitter and receiver electronics of a first sector 16, Sector A, of a base station 12. The dashed circles represent interference imposed on various ones of the user elements 18 from adjacent sectors 16, Sectors B-D. Further, each of Sectors A-D is associated with one code of a four-code cyclic power changing pattern, which is identical to the one described in association with FIG. 3 and repeated in associated FIG. 10. In association with the cyclic power changing patterns for each of Sectors A-D, FIG. 10 outlines the time slots in which transmissions to each of the user elements 18, UE1-UE5, would be most appropriate in light of the interference provided from adjacent sectors 16. The horizontal bars indicate the most appropriate time slots in which to schedule transmissions, not necessarily when transmissions will actually be scheduled, due to the different dynamic requirements a user may have from time to time.

As illustrated in FIG. 9, user element UE1 is not subjected to interference from Sectors B-D, and as such, transmissions to user element UE1 can be provided at any time and at any power level. For user element UE2, there is significant interference from Sector B as a result of overlap in coverage provided by Sectors A and B, and as such, transmissions should be scheduled for user element UE2 when transmissions from Sector B are at lower power levels. Transmissions to user element UE2 can be provided when Sector A is transmitting at higher or lower power levels, since interference is minimized by transmitting when Sector B is operating at lower power levels. User element UE3 is subjected to interference from Sectors C and D, and not from Sector B. As such, transmissions to user element UE3 should be scheduled during times when transmissions from Sector C and D are at lower power levels. Similarly, transmissions to user element UE3 can be provided when Sector A is transmitting at higher or lower power levels, since interference is minimized by transmitting when Sectors C and D are operating at lower power levels. User element UE4 is subjected to interference from Sector D, and as such, will preferably receive transmissions from the base station 12 when transmissions associated with Sector D are at lower power levels. Similarly, user element UE5 is subjected to interference from Sector C, and will receive transmissions from the base station 12 when Sector C is associated with lower transmit power levels.

Figure 10:
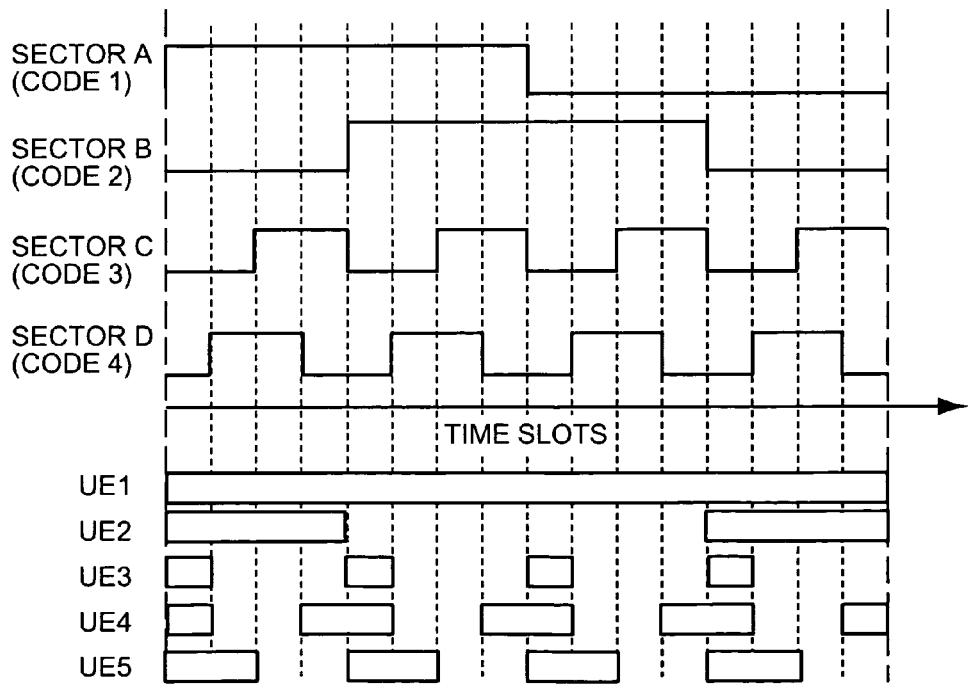
FIG. 10 illustrates the preferable time slots for scheduling transmissions to the various user elements of FIG. 9 based on the illustrated cyclic power change patterns for the various sectors.
Figure 11:
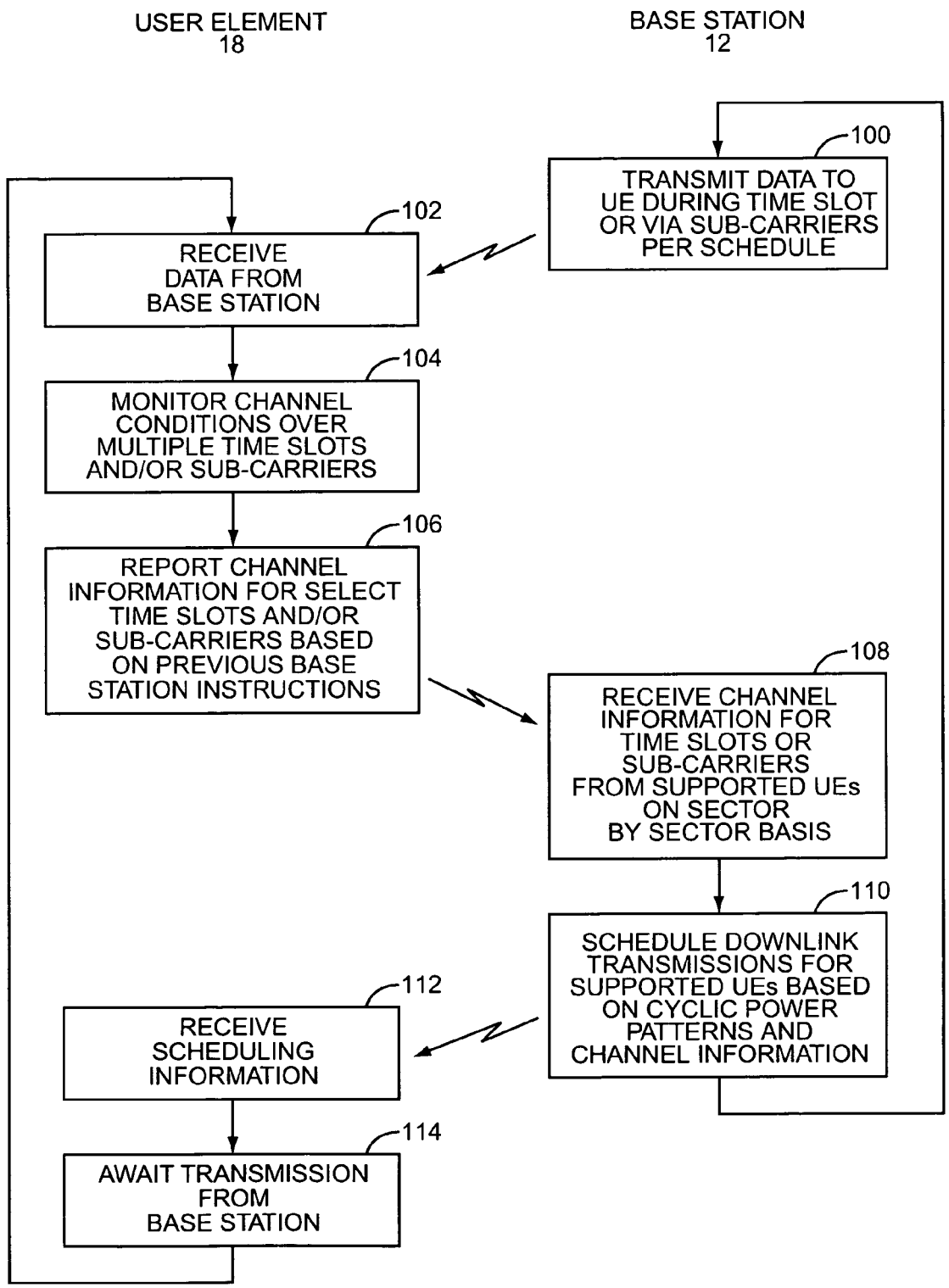
FIG. 11 is a flow diagram illustrating the basic operation of the present invention.

The chart of FIG. 10 provides guidelines for optimal transmission time slots. Scheduling for the various user elements UE1-UE5 is provided based on these guidelines, but is not restricted to the optimal time slots due to traffic loads and required data rates. In more complicated scenarios, there are more than two separate and distinct power levels, and the relative amount of interference dictates appropriate or otherwise potential time slots during which transmissions should occur. An overview of the scheduling process and information on which scheduling is based is provided in the flow chart of FIG. 11.

Initially, the base station 12 will transmit data to the appropriate user element 18 or user elements 18 according to a schedule (step 100). The data is transmitted during a particular time slot, using a defined sub-carrier or group of sub-carriers, or a combination thereof. The user element 18 will receive the data transmitted from the base station 12 (step 102) and concurrently or periodically monitor channel conditions over multiple time slots or for various sub-carriers (step 104). The channel conditions preferably relate to the channel-to-interference (C/I) ratios or the pilot signal strengths associated with transmissions in the supporting sector 16, and perhaps from any other adjacent sectors 16. Given the processing overhead associated with monitoring channel conditions, the base station 12 will typically instruct the user element 18 via a control channel to monitor channel conditions for select time slots or sub-carriers, instead of constantly monitoring all time slots or sub-carriers, as the case may be. Further, the channel conditions may be based on monitoring carrier or pilot signals transmitted from various base stations 12 or sector electronics, or any other reliable technique for determining the interfering effect of transmissions associated with other sectors 16.

Once the channel conditions are monitored, the user element 18 will report channel information for the selected time slots or sub-carriers to the base station 12 (step 106). The base station 12 will receive the channel information for the time slots or sub-carriers from the various user elements 18 on a sector-by-sector basis (step 108). Based on the channel information and data delivery requirements, the base station 12 will schedule downlink transmissions for its supported user elements 18, based in part on the cyclic power change patterns and the channel information, in light of the data delivery requirements (step 110).

Importantly, the base station 12 can be made aware of the power change patterns for adjacent sectors 16, whether the sector 16 is supported by the particular base station 12 or an adjacent base station 12, through communication with appropriate network control apparatus, as is well known in the cellular communication industry. With the knowledge of the cyclic power changing patterns associated with the various adjacent sectors 16, and knowledge of the interference from these adjacent sectors 16 on the relevant user elements 18, scheduling is effectively provided without requiring the base stations 12 to actively cooperate with one another, since the cyclic power changing patterns repeat and are known to all base stations 12. Further, the base stations 12 are synchronized such that the cyclic power changing patterns remain consistent with what is assumed by the other base stations 12. The scheduling information is sent to the various user elements 18 via a control channel. The user elements 18 will receive the scheduling information (step 112), and await transmission from the base station 12 according to the schedule (step 114). As noted, the scheduling may be based on time slots, respective sub-carriers or groups thereof, or a combination thereof. At this point, the process repeats, wherein data is transmitted to the user elements 18 per the base station schedule (step 100), and the user elements 18 will receive the data from the base station 12 (step 102).

As those skilled in the art will recognize, scheduling may take into consideration different quality of service levels or data rates among the various user elements 18. Preferably, the scheduling based on the cyclic power changing patterns is provided to maximize overall system capacity as well as per user throughput, while meeting the required quality of service (QoS) levels.

Figure 12:
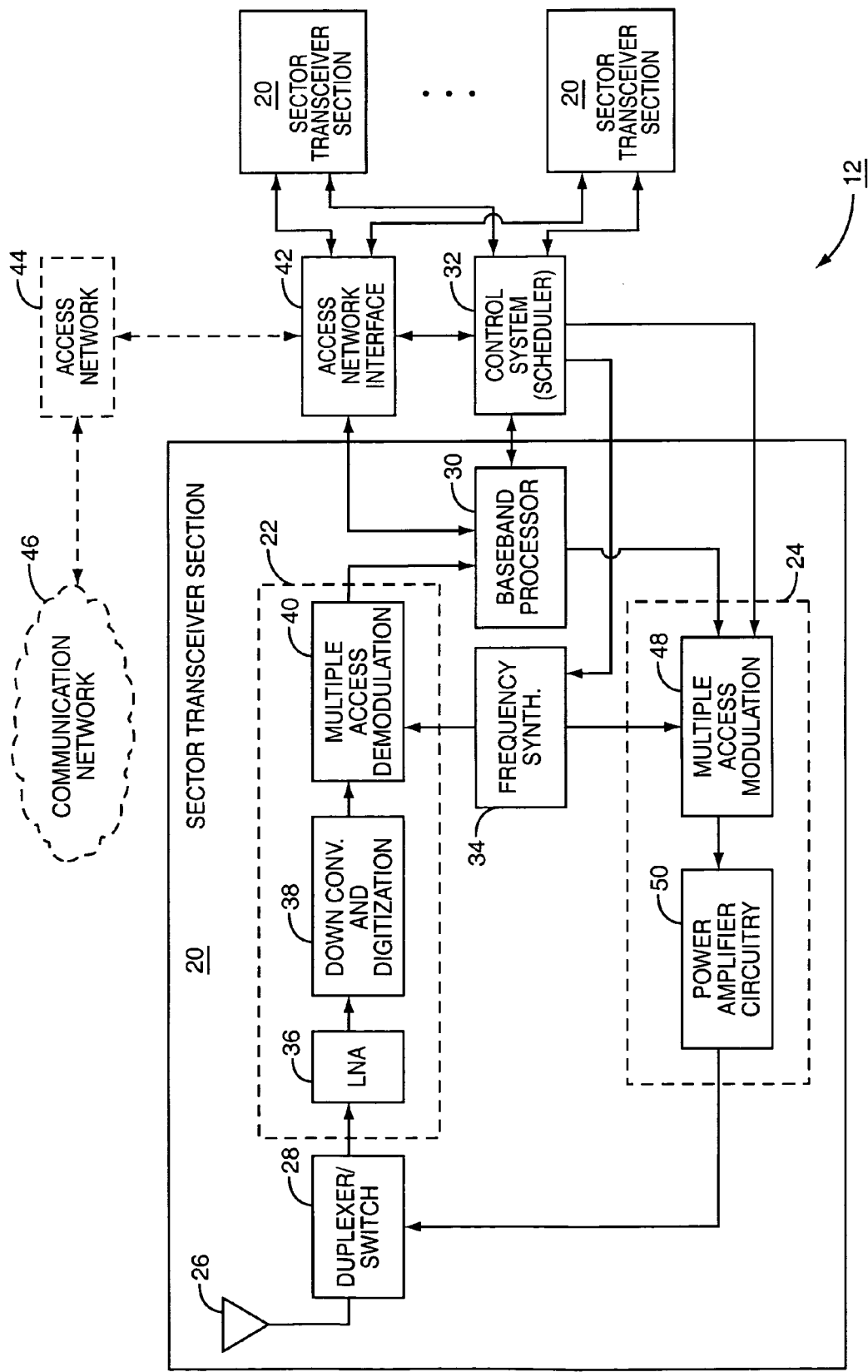
FIG. 12 is a block representation of a base station according to one embodiment of the present invention.

The following outlines the basic architectures for base stations 12 and user elements 18 according to exemplary embodiments of the present invention. FIG. 12 is a block diagram of a base station 12 configured according to one embodiment of the present invention to support a cell 14 having three sectors 16. For three sectors 16, the base station 12 will have three corresponding sector transceiver sections 20.

Each sector transceiver section 20 includes a receiver front end 22, a radio frequency (RF) transmitter section 24, an antenna 26, a duplexer or switch 28, a baseband processor 30, a control system 32, and a frequency synthesizer 34. The receiver front end 22 receives an information-bearing RF signal from one or more user elements 18 through the antenna 26. A low noise amplifier (LNA) 36 amplifies the RF signal. A filter circuit (not shown) minimizes broadband interference in the received signal, while downconversion and digitization circuitry 38 and multiple access demodulation function 40 downconverts, digitizes, and demodulates the filtered, received signal to an intermediate or baseband frequency signal to provide one or more digital streams. The receiver front end 22 and RF transmitter section 24 typically use one or more frequencies generated by the frequency synthesizer 34.

The baseband processor 30 processes the digitized received signal to extract the information or data bits conveyed in the received signal. This processing typically comprises any further demodulation, despreading, decoding, error correction, and inference cancellation operations. As such, the baseband processor 30 is generally implemented in one or more digital signal processors (DSPs), application specific integrated circuits (ASICs), or field programmable gate arrays (FPGAs). Further detail regarding the operation of the baseband processor 30 is described in greater detail below.

The information conveyed in the received signal is typically either data or signaling information. Incoming data is directed to an access network interface 42, which will forward the information to a supporting access network 44. The access network 44 facilitates communications with a variety of associated devices via a communication network 46, which may support wired or wireless circuit-switched or packet-switched communications. Signaling information is passed on to the control system 32 and used to assist communications with the user element 18 as discussed below in further detail.

On the transmit side, data to be transmitted to the user element 18 is received via the access network interface 42 and provided to the baseband processor 30. The baseband processor 30 encodes and spreads, if necessary, the digitized data, which may represent voice and/or data, from the access network interface 42 and signaling information from the control system 32. The resultant data and signaling information is output to the transmitter 24, where it is used by a modulator 48 to modulate a carrier signal that is at a desired transmit frequency. Power amplifier circuitry 50 amplifies the modulated carrier signal to a level appropriate for transmission, and delivers the modulated carrier signal to the antenna 26. Those skilled in the art will recognize the variation in operation of the above components and functions to facilitate CDMA, TDMA, OFDM, and other desired multiple access communications. An OFDM-based architecture requires the performance of an Inverse Fast Fourier Transform (IFFT) on the symbols to be transmitted. For demodulation, the performance of a Fast Fourier Transform (FFT) on the received signal is required to recover the transmitted symbols.

Figure 13:
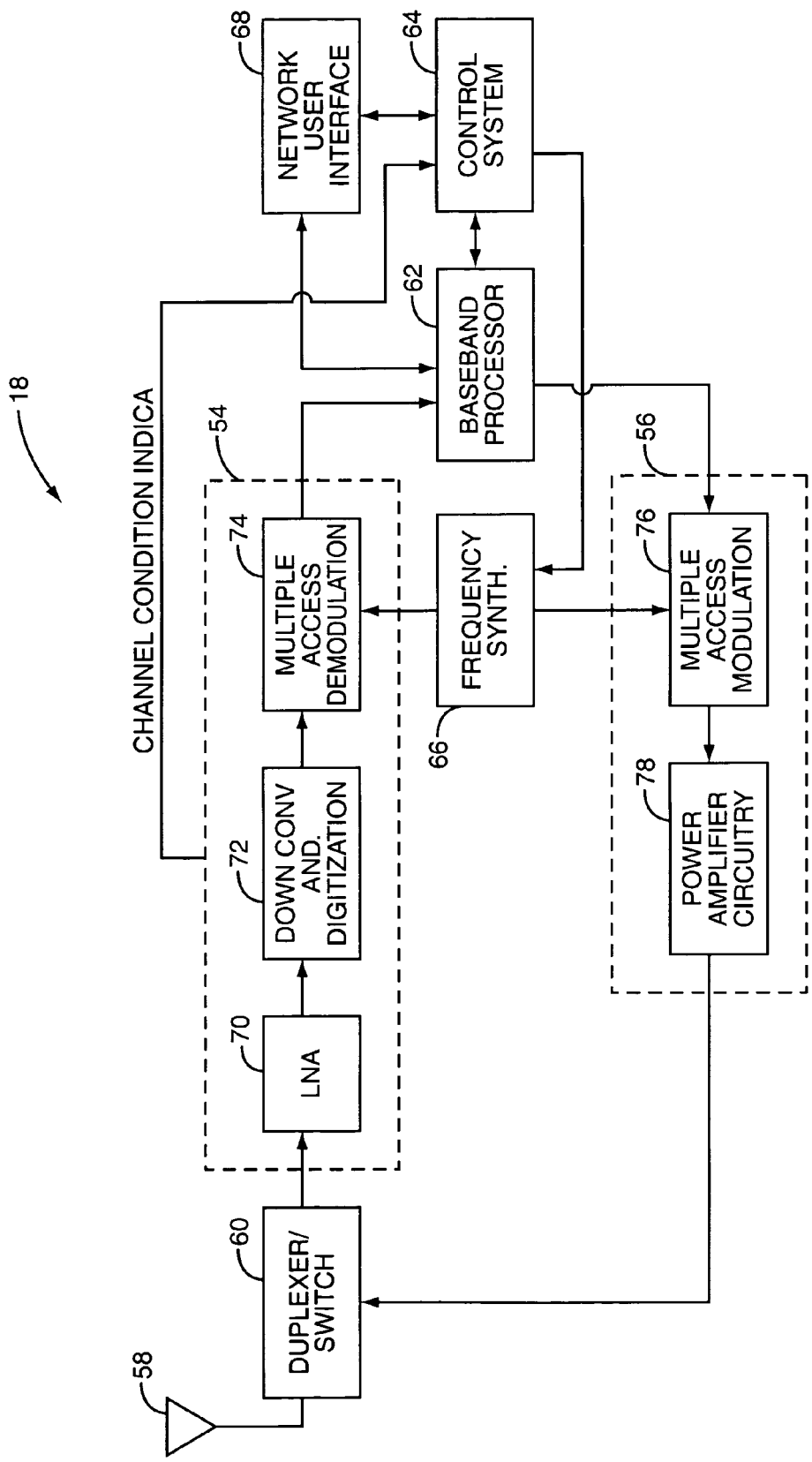
FIG. 13 is a block representation of a user element according to one embodiment of the present invention.

The basic architecture of a user element 18 is represented in FIG. 13 and may include a receiver front end 54, an RF transmitter section 56, an antenna 58, a duplexer or switch 60, a baseband processor 62, a control system 64, a frequency synthesizer 66, and a user interface 68. The receiver front end 54 receives information bearing radio frequency signals from one or more remote transmitters provided by the base station 12. A low noise amplifier 70 amplifies the received signals. A filter circuit (not shown) minimizes broadband interference in the received signal, while downconversion and digitization circuitry 72 and demodulation function 74 downconverts, digitizes and demodulates the filtered, received signal to an intermediate or baseband frequency signals provided in one or more digital streams. The receiver front end 54 and RF transmitter section 56 typically use one or more frequencies generated by the frequency synthesizer 66. The receiver front end 54 is also responsible for monitoring information bearing on channel conditions and providing channel condition indicia to the control system 64 to assist in controlling transmit power as described above.

The baseband processor 62 processes the digitized received signal to extract the information or data bits conveyed in the received signal. This processing typically comprises any further demodulation, despreading, decoding, error correction, and interference cancellation operations. The baseband processor 62 is generally implemented in one or more DSPs, ASICs, or FPGAs. The information conveyed in the received signal is typically either data or signaling information. Received data is directed to a network/user interface 68, which may provide a data interface for computing applications or a voice interface for telephony applications. Signaling information is passed on to the control system 64 and used to assist communications with the base station 12 as discussed below in further detail.

On the transmit side, data to be transmitted to the base station 12 is received via the network/user interface 68 and provided to the baseband processor 62. The baseband processor 62 encodes and spreads, if necessary, the digitized data, which may represent voice and/or data, from the network/user interface 68 and signaling information from the control system 64 for delivery to the base station 12. The data and signaling information is output to the RF transmit section 56, where it is used by a modulator 76 to modulate a carrier signal that is at a desired transmit frequency. Power amplifier circuitry 78 amplifies the modulated carrier signal to a level appropriate for transmission, and delivers the modulated carrier signal to the antenna 58.

Those skilled in the art will recognize improvements and modifications to the preferred embodiments of the present invention. All such improvements and modifications are considered within the scope of the concepts disclosed herein and the claims that follow.

What is claimed is:

1. A method for facilitating downlink communications from at least one base station to a plurality of user elements comprising:
   a) providing different cyclic power changing patterns for adjacent sectors in a cellular system, each cyclic power changing pattern defining a unique pattern in which power levels change in a cyclic manner for a communication resource used to transmit data to user elements;
   b) for each user element in a given sector, scheduling data to be transmitted to each user element in the given sector based on interference imposed on transmissions to the user element from sectors adjacent to the given sector to take advantage of changing power levels for the given sector and the sectors adjacent to the given sector; and
   c) transmitting the data to the user elements based on the scheduling and using the cyclic power changing patterns.

2. The method of claim 1 wherein the communication resource comprises a plurality of time slots in which data is scheduled and transmitted to respective ones of the user elements and the cyclic power changing patterns have a defined period of a select number of time slots.

3. The method of claim 2 wherein for at least one time slot in each defined period only transmissions in one of the adjacent sectors are at a higher power level.

4. The method of claim 3 wherein for the at least one time slot all transmissions in adjacent sectors other than the one of the adjacent sectors are at a lower power level.

5. The method of claim 2 wherein for at least one time slot in the given period all transmissions in all adjacent sectors are at a lower power level.

6. The method of claim 2 wherein for at least one time slot in the given period all transmissions in all adjacent sectors are at a higher power level.

7. The method of claim 1 wherein the cyclic power changing patterns of different sectors are substantially orthogonal to each other.

8. The method of claim 1 wherein the communication resource comprises a plurality of sub-carriers or groups thereof, in which data is scheduled and transmitted to respective ones of the user elements and the cyclic power changing patterns have a defined number of sub-carriers.

9. The method of claim 8 wherein for at least one sub-carrier or group thereof in each defined number of sub-carriers only transmissions in one of the adjacent sectors are at a higher power level.

10. The method of claim 9 wherein for the at least one sub-carrier or group thereof in each defined number of sub-carriers all transmissions in adjacent sectors other than the one of the adjacent sectors are at a lower power level.

11. The method of claim 8 wherein for at least one sub-carrier or group thereof in each defined number of sub-carriers all transmissions in all adjacent sectors are at a lower power level.

12. The method of claim 8 wherein for at least one sub-carrier or group thereof in each defined number of sub-carriers all transmissions in all adjacent sectors are at a higher power level.

13. The method of claim 1 wherein a plurality of base stations define cells with a set number of sectors and assign identical cyclic power changing patterns to corresponding sectors in the respective cells.

14. The method of claim 13 wherein the base stations are synchronized such that the cyclic power changing patterns are synchronized.

15. The method of claim 1 further comprising receiving channel indicia from the user elements, the channel indicia indicative of interference from adjacent base stations.

16. The method of claim 15 further comprising instructing the user elements to provide the channel indicia according to defined criteria.

17. The method of claim 1 wherein the scheduling provides different quality of service levels to different ones of the user elements.

18. The method of claim 1 wherein the scheduling provides different throughput rates to different ones of the user elements.

19. The method of claim 1 wherein the scheduling attempts to optimize overall system capacity.

20. The method of claim 1 wherein the scheduling attempts to optimize individual throughput.

21. A control system for a base station to facilitate downlink communications to a plurality of user elements, comprising control circuitry associated with receive circuitry and transmit circuitry of the base station and adapted to:
   a) provide different cyclic power changing patterns for adjacent sectors in a cellular system, each cyclic power changing pattern defining a unique pattern in which power levels change in a cyclic manner for a communication resource used to transmit data to user elements;
   b) for each user element in a given sector, scheduling data to be transmitted to each user element in the given sector based on interference imposed on transmissions to the user element from sectors adjacent to the given sector to take advantage of changing power levels for the given sector and the sectors adjacent to the given sector; and c) transmit the data to the user elements based on the scheduling and using the cyclic power changing patterns.

22. The control system of claim 21 wherein the communication resource comprises a plurality of time slots in which data is scheduled and transmitted to respective ones of the user elements and the cyclic power changing patterns have a defined period of a selected number of time slots.

23. The control system of claim 22 wherein for at least one time slot in each defined period only transmissions in one of the adjacent sectors are at a higher power level.

24. The control system of claim 23 wherein for the at least one time slot all transmissions in adjacent sectors other than the one of the adjacent sectors are at a lower power level.

25. The control system of claim 22 wherein for at least one time slot in the defined period all transmissions in all adjacent sectors are at a lower power level.

26. The control system of claim 22 wherein for at least one time slot in the given period all transmissions in all adjacent sectors are at a higher power level.

27. The control system of claim 21 wherein the cyclic power changing patterns are substantially orthogonal to each other.

28. The control system of claim 21 wherein the communication resource comprises a plurality of sub-carriers or groups thereof, in which data is scheduled and transmitted to respective ones of the user elements, and the cyclic power changing patterns have a defined number of sub-carriers.

29. The control system of claim 28 wherein for at least one sub-carrier or group thereof in each defined number of sub-carriers only transmissions in one of the adjacent sectors are at a higher power level.

30. The control system of claim 29 wherein for the at least one sub-carrier or group thereof in each defined number of sub-carriers all transmissions in adjacent sectors other than the one of the adjacent sectors are at a lower power level.

31. The control system of claim 28 wherein for at least one sub-carrier or group thereof in each defined number of sub-carriers all transmissions in all adjacent sectors are at a lower power level.

32. The control system of claim 28 wherein for at least one sub-carrier or group thereof in each defined number of sub-carriers all transmissions in all adjacent sectors are at a higher power level.

33. The control system of claim 21 wherein a plurality of base stations define cells with a set number of sectors and assign identical cyclic power changing patterns to corresponding sectors in the respective cells.

34. The control system of claim 33 wherein the base stations are synchronized such that the cyclic power changing patterns are synchronized.

35. The control system of claim 21 wherein the control system is further adapted to process a channel indicia received from the user elements, the channel indicia indicative of interference from the adjacent sectors stations.

36. The control system of claim 35 further comprising instructing the user elements to provide the channel indicia according to defined criteria.

37. A cellular system comprising a plurality of base stations, which define cells made of sectors, each base station adapted to:

a) provide different cyclic power changing patterns for adjacent sectors in a cellular system, each cyclic power changing pattern defining a unique pattern in which power levels change in a cyclic manner for a communication resource used to transmit data to user elements;

b) for each user element in a given sector, scheduling data to be transmitted to each user element in the given sector based on interference imposed on transmissions to the user element from sectors adjacent to the given sector to take advantage of changing power levels for the given sector and the sectors adjacent to the given sector; and c) transmit the data to the user elements based on the scheduling and using the cyclic power changing patterns, wherein unique cyclic power changing patterns are provided for all adjacent sectors within a given cell and within adjacent cells.

* * * * *